US012566022B2

(12) United States Patent
Jervas

(10) Patent No.: US 12,566,022 B2
(45) Date of Patent: Mar. 3, 2026

(54) DRONE SNOWMAKING AUTOMATION

(71) Applicant: TOPGUN Snowmaking Inc., Hinsdale, MA (US)

(72) Inventor: Troy Jervas, Hinsdale, MA (US)

(73) Assignee: TOPGUN SNOWMAKING, INC., Hinsdale, MA (US)

( * ) Notice: Subject to any disclaimer, the term of this patent is extended or adjusted under 35 U.S.C. 154(b) by 221 days.

(21) Appl. No.: 18/425,827

(22) Filed: Jan. 29, 2024

(65) Prior Publication Data

US 2024/0255205 A1 Aug. 1, 2024

Related U.S. Application Data

(60) Provisional application No. 63/481,908, filed on Jan. 27, 2023.

(51) Int. Cl.
*F25C 3/04* (2006.01)
*B64U 20/87* (2023.01)
*B64U 101/26* (2023.01)

(52) U.S. Cl.
CPC ................ *F25C 3/04* (2013.01); *B64U 20/87* (2023.01); *B64U 2101/26* (2023.01); *B64U*
*2201/10* (2023.01); *B64U 2201/20* (2023.01); *F25C 2600/04* (2013.01)

(58) Field of Classification Search
CPC .... F25C 3/04; F25C 2600/04; B64U 2201/10; B64U 2201/20
See application file for complete search history.

(56) References Cited

U.S. PATENT DOCUMENTS

2022/0011034 A1 1/2022 Dodson

*Primary Examiner* — Kito R Robinson
*Assistant Examiner* — Roy Rhee
(74) *Attorney, Agent, or Firm* — Heslin Rothenberg Farley & Mesiti, P.C.

(57) ABSTRACT

An aerial drone has a communication component configured and programmed to receive a first signal from a remote controller. The first signal may be configured and programmed to control a movement of the aerial drone and/or a sending of a second signal. The communication component may further be configured and programmed to send the second signal to a snowmaking device. The second signal may be configured and programmed to be received by the snowmaking device to direct a motor of the snowmaking device.

20 Claims, 2 Drawing Sheets

DRONE SNOWMAKING AUTOMATION

CROSS-REFERENCE TO RELATED APPLICATIONS

This application claims benefit of priority from U.S. Provisional Patent Application No. 63/481,908, filed Jan. 27, 2023, the entire contents of which are incorporated herein by reference.

TECHNICAL FIELD

The present invention generally relates to artificial snow making, and more particularly, to methods and devices for making snow.

BACKGROUND

In general, artificial snow-making involves atomizing a spray of water with a jet of air to create a plume of very fine water droplets which nucleate and form snow as the plume drops to earth under freezing temperature conditions. Water and air may be brought separately up a tower in inner and outer, concentric, spaced apart conduits. The air may flow through the inner conduit passageway and the water through the annular passageway formed between the conduits. As a result, the water stream functions to insulate the air stream.

The water stream is supplied under pressure to a point of discharge above ground level and adjacent to a top end of a tower where it is discharged through a nozzle into the ambient freezing atmosphere in the form of the spray. The spray is preferably a high velocity spray of discrete water particles. Air is also supplied under pressure to a second point of discharge at the top of the tower where it is discharged through an orifice to form a jet of air which is directed into the water spray thereby forming a plume of atomized or nucleated water. Thus, atomized water forms seed crystals in a freezing atmosphere, and through the dwell time of the long fall from the top of the tower to the ground, forms snow. In some cases, the nucleation of water may be achieved by mixing the air and water internally.

A snowmaking system for a particular area may include many snow towers or guns to supply snow over such area. Starting and shutting down snowmaking guns, as well as periodic checking of guns and snow quality is normally done by travelling to each snowmaking gun on foot, or by snowmobile or an ATV.

It may be desirable to remotely control a functional status of such snowmaking guns at particular times based on ambient weather conditions. For example, it may be desirable to remotely start and stop snow making operations of such towers or guns, or control a particular flow of water and/or air thereto.

Therefore, a need exists for snow making systems, methods and devices to efficiently control a functional status of snowmaking guns on snowmaking hydrants or similar devices or machines.

SUMMARY OF THE INVENTION

In accordance with the above, it is an object of the present invention to provide improved snow making systems, methods and devices to efficiently control a functional status of snowmaking hydrants or similar devices or machines.

The present disclosure provides, in a first aspect, an aerial drone. The aerial drone may include a communication component configured and programmed to receive a first signal from a first controller. The first signal may be configured and programmed to control a movement of the aerial drone and/or a sending of a second signal. The communication component may further be configured and programmed to send the second signal to a snowmaking device. The second signal may be configured and programmed to be received by the snowmaking device to direct a motor of the snowmaking device.

The present disclosure provides, in a second aspect, a system for controlling a snowmaking device. The system may include at least one snowmaking device, the at least one snowmaking device including a motor connected to at least one valve. The motor may be configured and programmed to control an opening and/or closing of the at least one valve in response to a signal received by the snowmaking device. The system may further include an aerial drone. The aerial drone may include at least one communication component configured and programmed to send the signal to the at least one snowmaking device. The signal may cause an adjustment to an openness of the at least one valve via the motor.

The present disclosure provides, in a third aspect, a method for controlling a snowmaking device. The method may include locating at least one snowmaking device. The method may further include navigating an aerial drone including at least one communication component towards the at least one snowmaking device to be within a threshold proximity of the at least one snowmaking device. The threshold proximity may be a distance at which the at least one snowmaking device can receive a signal from the communication component of the aerial drone. The method may further include sending the signal from the aerial drone to the at least one snowmaking device to cause an adjustment to the at least one valve.

These, and other objects, features and advantages of this invention will become apparent from the following detailed description of the various aspects of the invention taken in conjunction with the accompanying drawings.

BRIEF DESCRIPTION OF THE DRAWINGS

The accompanying drawings, which are incorporated in and constitute a part of the specification, illustrate embodiments of the disclosure and together with the detailed description herein, serve to explain the principles of the disclosure. The drawings are thus only for purposes of illustrating preferred embodiments and are not to be construed as limiting the disclosure.

DETAILED DESCRIPTION OF THE INVENTION

Generally stated, disclosed herein are systems, methods and device for efficiently controlling a functional status of snowmaking hydrants or similar devices or machines.

Figure 1:
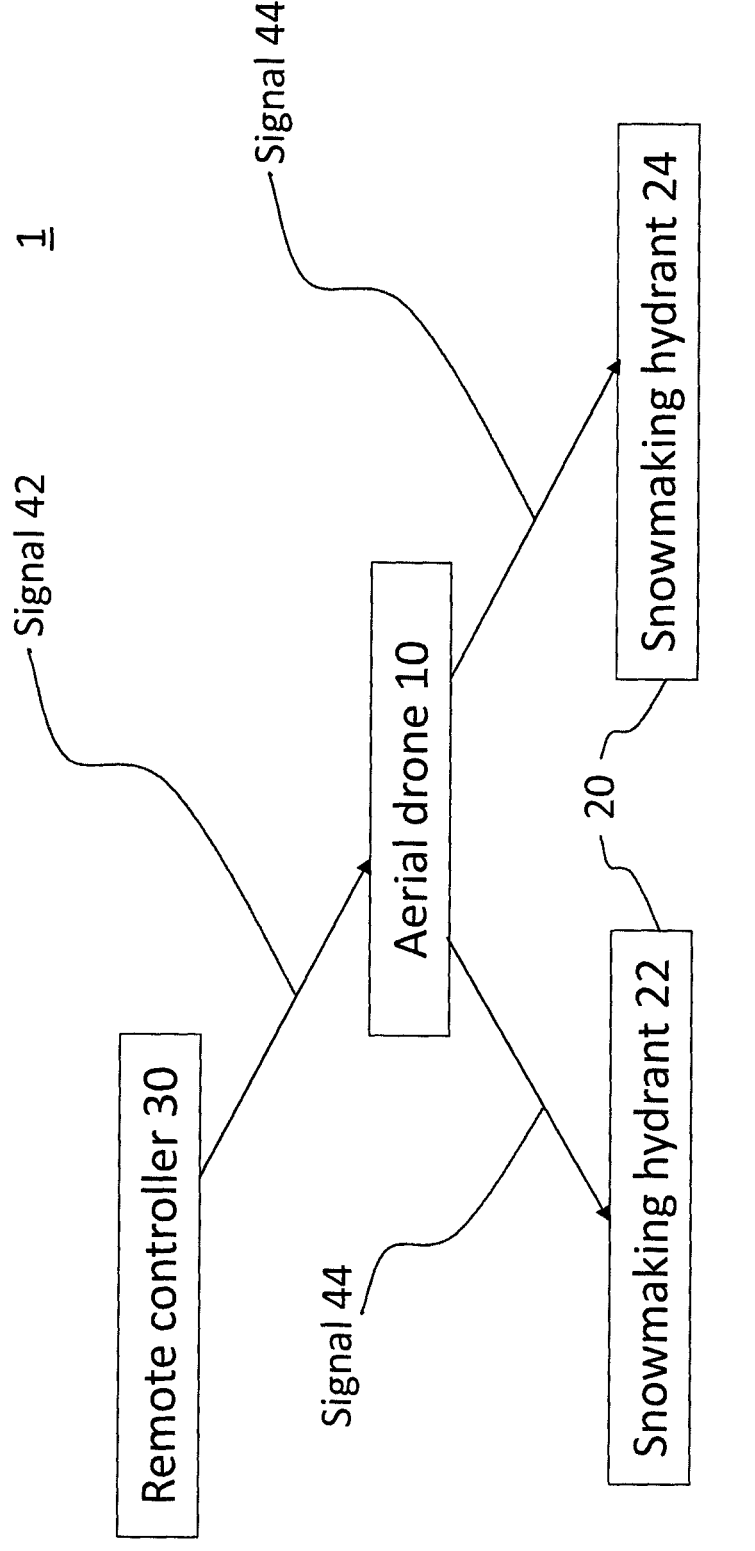
FIG. 1 depicts a block diagram of a system for controlling a functional status of one or more snowmaking devices, in accordance with an aspect of the present disclosure.

An aerial remote controlled drone 10 may be utilized to control an actuator on a snowmaking system 1 having one or more snowmaking devices or hydrants 20 (e.g., motor controlled valves) with self-draining valves, as shown in FIG. 1. The snowmaking system 1 may include the aerial drone 10 and the one or more hydrants 20. In embodiments, the snowmaking system 1 may include a remote controller 30 which may be human operated. Valves of the hydrants may be configured as dual fluid valves, e.g., configured to control both air and water. Alternatively, valves of the snowmaking hydrants 20 may be configured as single fluid valves, e.g., controlling water only.

Such a drone 10 may be utilized to allow an operator of the drone 10 to oversee and control a snowmaking operation (e.g., the snowmaking system 1). The drone 10 may be operated to fly from a launching point of the drone 10 to be within a threshold proximity or an immediate area of a first snowmaking hydrant 22 of the one or more snowmaking hydrants 20. The drone 10 may also be operated to fly from an immediate area of the first snowmaking hydrant 22 to immediate areas of the other hydrants, such as a second snowmaking hydrant 24 of the snowmaking hydrants 22 in the snowmaking system 1. Because the drone 10 would be in the immediate area of each of the snowmaking hydrants 22, 24, a plurality of signals 40 may be utilized to activate (e.g., turn on, turn off, or otherwise control) an actuator of each of the one or more snowmaking hydrants 20 as the drone 10 moves from an immediate area of each of the one or more snowmaking hydrants 20 to an immediate area of each other hydrant of the snowmaking hydrants 20. In embodiments, the plurality of signals 40 may be a plurality of short-range signals (e.g., an infrared signal, radio signal, Bluetooth, or other wireless communication signal emitted by the aerial drone 10 controlled by the user). In other embodiments, the plurality of signals 40 may be a combination of short-range and long-range signals.

In embodiments, the aerial drone 10 may include one or more communication components (not shown) to allow for the receiving and/or sending of the plurality of signals 40. The one or more communication components may include a number of components on an as-needed basis, such as a transmitter, receiver, processor, and/or memory. In embodiments, the one or more communication components may include the receiver and/or the processor to permit the aerial drone 10 to receive and/or process the first signal 42 from the controller 30 to direct movement(s) of the aerial drone 10 and/or to direct the aerial drone 10 to send the second signal 44. Further, in embodiments the one or more communication components may include the transmitter, which may permit the aerial drone 10 to send the second signal 44, for example, in response to the first signal 42.

In an example, the plurality of short-range signals 40 may include a first signal 42 which is sent from the remote controller 30 to the aerial drone 10 (e.g., to the one or more communication components) to direct a movement of the aerial drone 10 (e.g., from a launching point to the first snowmaking hydrant 22, or between the any of the one or more snowmaking hydrants 20). The first signal 42 may also direct a sending of a second signal 44 or a plurality thereof from the aerial drone 10 (e.g., from the one or more communication components) to any of the one or more snowmaking hydrants 20 (e.g., the first snowmaking hydrant 22 and/or the second snowmaking hydrant 24). The second signal 44 may direct any of the one or more snowmaking hydrants 20 (e.g., a motor of the snowmaking hydrants 20) to open or close at least one valve to control a flow of air and/or water through and/or out of any of the one or more snowmaking hydrants 20 during a production of snow.

As described above, actuators of valves of the snowmaking hydrants 20 may be controlled by the aerial drone 10 flying near such valves, and thus no other network, such as Wi-Fi or fiber, or any communication line, would be needed to allow the valves of the one or more snowmaking hydrants 20 to be controlled as the drone 10 would be the source of communication. In embodiments, the controlling systems (e.g., receivers and processors) connected to the one or more snowmaking hydrants 20 to allow a control of the motors operating the valves may be powered by a battery to avoid connecting any electrical power lines to such controlling systems for the hydrant valves. In alternative embodiments, such controlling systems could be connected to such electrical power lines when they are run to the vicinity thereof. In even further embodiments, such controlling systems may be powered by wireless power transmission. Controlling systems may include, for example, fan motors and compressors, as well as operating valves for pipelines and drains. Each and any of these controlling systems may be controlled via the second signal 44 and/or another signal of the plurality of signals 40.

A hand-held remote (e.g., an infrared remote controller, radio signal remote controller or other wireless controller) could be used to control the one or more snowmaking hydrants 20 if the aerial drone 10 being utilized to control the one or more snowmaking hydrants 20 was inactivated for any reason. In this case, the user would drive or walk by each or any of the one or more snowmaking hydrant 20, controlling the actuator of each or any of the one or more snowmaking hydrants 20 from a distance without having to stop at each unit. The actuator of each of the one or more snowmaking hydrants 20 may also include a manual override to allow the units to be controlled (e.g., started, stopped or a flow thereto controlled) even if an electrical failure to the controller(s) 30 or any of the one or more snowmaking hydrants 20 was to occur. The manual override may include an operator manually closing or opening one or more valves of the snowmaking hydrants 20, for example, via a handle directly attached to any snowmaking hydrant of the one or more snowmaking hydrants 20.

Further, a user may utilize the aerial drone 10 to visually inspect aspects of the snowmaking system 1 and operation thereof via a camera (not shown) on the drone which may send photos, videos or livestreamed video to a personal computer or mobile device via a cellular network or other wireless network or method. For example, a user may be able to see a functional status (e.g., emitting snow or not) of the snowmaking tower or gun of the first snowmaking hydrant 22 via a livestream, photo or recorded video captured by the camera and would also be able to visually check on a quality of snow being produced. The user may be able to repeat this process to visually inspect and/or evaluate any of the one or more snowmaking hydrants 20.

In contrast to prior art methods of controlling (e.g., starting, stopping and flow control) snowmaking guns of snowmaking hydrants, as well as periodic checking of such guns, control via an aerial drone 10 would be faster, and may allow one person to monitor more snowmaking guns more quickly and from a safer environment. Such remote use of hydrant valves may be facilitated by a self-draining feature thereof, such that a user would not need to physically access each snowmaking gun and freeze ups thereof may be avoided.

In embodiments, there may be automatic navigation features. For example, the aerial drone 10 may include automated flight plans and mapping. Automated flight plans may include a predetermined pathway or trajectory for the aerial drone 10 indicating the location of one or more snowmaking hydrants 22. Where there are multiple of the one or more snowmaking hydrants 20, the automated flight plans may include an order in which the aerial drone 10 is to navigate to and/or interact with each of the respective one or more snowmaking hydrants 20.

Automatic navigation features may also include a failsafe flight plan. The failsafe flight plan may include a predetermined pathway or trajectory for the aerial drone 10 to navigate autonomously to return to its take-off point, or to another preferred landing location. The aerial drone 10 may invoke the failsafe flight plan under one or a number of circumstances or events. In embodiments where the aerial drone 10 is controlled remotely by a user, for example, the failsafe flight plan may be invoked upon a loss of connection between the remote controller being used by the user and the aerial drone 10. In another example, the failsafe flight plan may be invoked where the aerial drone 10 is low on battery (e.g., in the case of a battery powered drone) and would be unable to complete other tasks without shutting down. Such invocations of the failsafe flight plan may prevent the need to look for a drone (e.g., the aerial drone 10) following an adverse event or circumstance.

In some embodiments, the aerial drone 10 may also include an auto-landing feature. The auto-landing feature may permit the aerial drone to be landed by users with less experience and/or training flying drones (e.g., the aerial drone 10) than in the case of where the user is has been trained to land drones manually. The auto-landing feature may also minimize, mitigate, and/or prevent damage to the aerial drone 10 which may be caused by unwanted contact between the aerial drone 10 and physical obstacles in the surrounding area.

Figure 2:
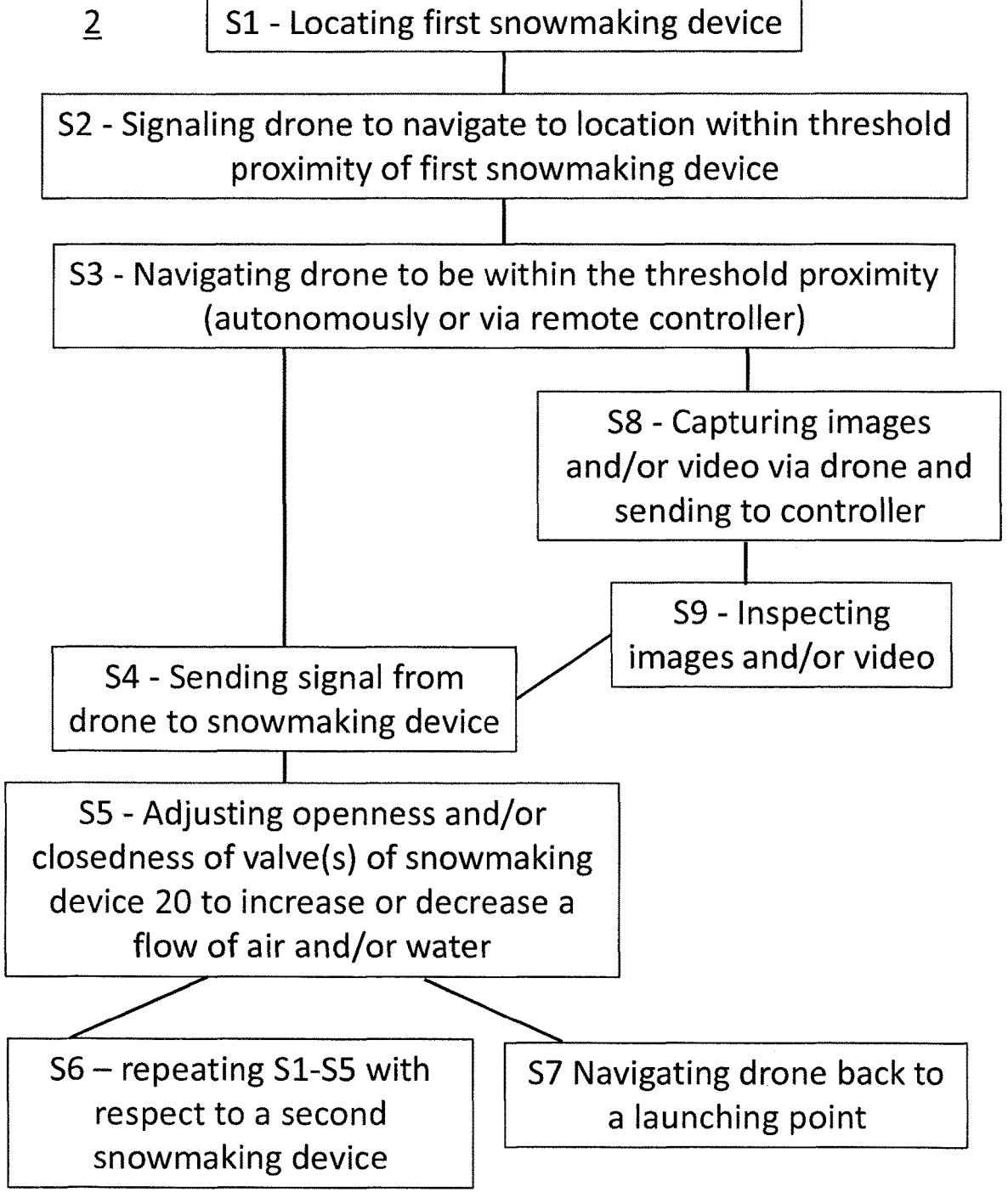
FIG. 2 depicts a flow chart of a method for controlling a functional status of one or more snowmaking devices, in accordance with an aspect of the present disclosure.

As shown in FIG. 2, a method 2 for controlling a first snowmaking hydrant 22 of the snowmaking system 1 may include locating the first snowmaking hydrant 22 of the one or more snowmaking hydrants 20 (S1) (e.g., such as on a trail of a mountain used for snow sports). The method 2 may further include navigating the aerial drone 10 including at least one communication component towards the first snowmaking hydrant 22 to be within a threshold proximity of the first snowmaking hydrant 22 (S3). The first signal 42 may be sent to the aerial drone 10, for example, from the controller 30, to indicate and/or direct the aerial drone 10 to a location within the threshold proximity of the first snowmaking hydrant 22 (S2). The threshold proximity may be a distance at which the first snowmaking hydrant 22 is capable of receiving the second signal 44 sent from the communication component of the aerial drone 10. The method 2 may further include sending the second signal 44 from the aerial drone 10 to the first snowmaking hydrant 22 to cause an adjustment to at least one valve of the first snowmaking hydrant 22 (S4). An example of an adjustment to the at least one valve may be an opening or closing of the at least one valve to modify (e.g., increase or decrease) the amount of air and/or water flowing trough and/or out of the first snowmaking hydrant 22.

In embodiments, the first snowmaking hydrant 22 may include a motor connected to the at least one valve. In such an embodiment, the sending of the second signal 44 from the aerial drone 10 to the first snowmaking hydrant 22 to cause an adjustment to the at least one valve may further include adjusting an openness or closedness of the at least one valve via the motor to increase or decrease a flow of air and/or water through the first snowmaking hydrant 22 (S5). Adjusting the openness or closedness of the at least one valve may start, stop, increase and/or decrease the production of snow via the first snowmaking hydrant 22. In another example, the at last one valve controlled via one or more signals (e.g., signal 44) instructing operation of one or more motors may be located outside of a hydrant (e.g., the first snowmaking hydrant 22), such as in a supply line of water and/or air located upstream of the hydrant. Further, such signals may cause an opening and/or closing of a drain line(s) connected to a hydrant (e.g., the first snowmaking hydrant 22) via valve(s) and motor(s) as described.

In embodiments, the navigating the aerial drone 10 towards the first snowmaking hydrant 22 such that the aerial drone 10 is within the threshold proximity of the first snowmaking hydrant 22 may further include sending the first signal 42 from the remote controller 30 to the aerial drone 10 (S2), the first signal 44 being different from the second signal 42. The second signal 42 may indicate and/or direct a movement of the aerial drone 10 from a first location to a second location within the threshold proximity of the first snowmaking hydrant 20.

In embodiments, there may instead be a plurality of snowmaking hydrants 20 (e.g., the one or more snowmaking hydrants 20, as discussed above). In such embodiments, the aerial drone 10 may be navigated to be within the threshold proximity of the first snowmaking hydrant 22, and may further include navigating the aerial drone 10 along a predetermined and/or automated flight path between a first location within a first threshold proximity of the first snowmaking hydrant 22 of the plurality of snowmaking hydrants 20 and a second location within a second threshold proximity of the second snowmaking hydrant 24 of the plurality of snowmaking hydrants 20 (S6). Alternatively, the navigating the aerial drone 10 to be within the threshold proximity of the first snowmaking hydrant 22 may further include sending the first signal 42 from the remote controller 30 to the aerial drone 10, the first signal 42 being different from the second signal 44. The first signal 42 may indicate and/or direct a movement of the aerial drone 10 between the first location and the second location (S6). Put simply, once the aerial drone 10 has completed S5 (e.g., modified the production of snow by increasing or decreasing the flow of air and/or water), S1-S5 may be repeated with respect to the second snowmaking hydrant 24, or with respect to however many snowmaking hydrants of the plurality of snowmaking hydrants 20 are to be serviced by the aerial drone 10. Alternatively, the aerial drone 20 may be directed back to the launching point as described above (S7), or to another preferred location.

In embodiments, the method 2 may further include capturing images and/or video via a camera connected to the aerial drone 10, and sending the captured images and/or video to the remote controller 30 (S8). In some embodiments, the method 2 may further include sending the captured images and/or video to the remote controller 30 in real-time. Where the captured images and/or video are sent to the remote controller 30 in real-time, the method 2 may further include analyzing and/or inspecting the captured images and/or video to determine a status of each or any of the one or more snowmaking hydrants 20 during operation of the snowmaking system 1 (S9). Determining the status of the first snowmaking hydrant 22, for example, may include determining an openness and/or closedness of the at least one valve, or determining whether the aerial drone 10 is within the threshold proximity of the first snowmaking hydrant 22. The images and/or video captured by the drone 10 may also be inspected and/or analyzed for some other reason, or at a later time and/or date. The images and/or video may thus also be stored to a memory for later viewing.

The above described systems and methods for controlling snowmaking guns of snowmaking systems could be utilized to control various types and aspects of snowmaking guns including controlling valves in conduits supplying air and/or water, and controlling an amount of flow of air and/or water. The communication described between aerial drones and receivers connected to processors or controllers and motors to control such controlling valves could be any type of wireless communication to allow a drone in the immediate area of a snowmaking gun to control an operation of such snowmaking gun.

While several aspects of the present invention have been described and depicted herein, alternative aspects may be effected by those skilled in the art to accomplish the same objectives. Accordingly, it is intended to cover all such alternative aspects as fall within the true spirit and scope of the invention.

The invention claimed is:

1. An aerial drone, comprising:

a communication component configured and programmed to receive a first signal from a remote controller, the first signal configured and programmed to control a movement of the aerial drone and a sending of a second signal; and the communication component further configured and programmed to send the second signal to a snowmaking device, the second signal configured and programmed to be received by the snowmaking device to direct a motor of the snowmaking device.

2. The aerial drone of claim 1, further comprising an imaging device configured and programmed to capture images or video of an area surrounding the aerial drone.

3. The aerial drone of claim 1, further comprising an imaging device configured and programmed to provide a live video feed of an area surrounding the aerial drone to an operator of the aerial drone.

4. The aerial drone of claim 1, wherein the remote controller is configured and programmed to be controlled by a human operator.

5. The aerial drone of claim 1, wherein the second signal is a short-range signal, the short-range signal being one of an infrared signal, a radio signal, and a Bluetooth signal.

6. The aerial drone of claim 1, wherein the second signal is further configured to direct the motor of the snowmaking device to adjust an openness of at least one valve of the snowmaking device.

7. A system for controlling a snowmaking device, the system comprising:

at least one snowmaking device, the at least one snowmaking device including a motor connected to at least one valve, the motor configured and programmed to control an opening and/or closing of the at least one valve in response to a signal received by the snowmaking device; and an aerial drone, the aerial drone including at least one communication component configured and programmed to send the signal to the at least one snowmaking device, the signal causing an adjustment to an openness of the at least one valve via the motor.

8. The system of claim 7, wherein the signal is a first signal, and wherein the aerial drone is configured and programmed to receive a second signal from a controller, the second signal directing a movement of the aerial drone.

9. The system of claim 7, wherein the signal is a first signal, and wherein the aerial drone is configured and programmed to receive a second signal from a controller, the second signal directing a sending of the first signal from the aerial drone to the snowmaking device.

10. The system of claim 7, wherein the at least one snowmaking device comprises a plurality of snowmaking devices, and wherein the at least one communication component is configured and programmed to send the signal to each snowmaking device of the plurality of snowmaking devices.

11. The system of claim 7, wherein the aerial drone is further configured and programmed to navigate along a predetermined flight path between a launch pad of the aerial drone and the snowmaking device.

12. The system of claim 11, wherein the predetermined flight path further comprises a failsafe flight path, the failsafe flight path directing the aerial drone to return to the launch pad upon the occurrence of an adverse circumstance.

13. The system of claim 7, further comprising an operator, wherein the aerial drone further includes an imaging device, and wherein the communication component is configured and programmed to provide images or video captured by the imaging device to the operator.

14. A method for controlling a snowmaking device, the method comprising:

locating at least one snowmaking device;

navigating an aerial drone including at least one communication component towards the at least one snowmaking device to be within a threshold proximity of the at least one snowmaking device, the threshold proximity being a distance at which the at least one snowmaking device can receive a signal sent from the communication component of the aerial drone;

sending the signal from the aerial drone to the at least one snowmaking device to cause an adjustment to the at least one valve.

15. The method of claim 14, wherein the at least one snowmaking device includes a motor connected to the at least one valve, and wherein the sending the signal from the aerial drone to the at least one snowmaking device to cause an adjustment to the at least one valve further comprises adjusting an openness of the at least one valve via the motor to increase or decrease a flow of air and/or water through the at least one snowmaking device.

16. The method of claim 14, wherein the navigating the aerial drone towards the at least one snowmaking device to be within a threshold proximity of the at least one snowmaking device further comprises sending a second signal from a remote controller to the aerial drone, the second signal being different than the signal, and the second signal indicating a movement of the aerial drone from a first location to a second location within the threshold proximity of the at least one snowmaking device.

17. The method of claim 14, wherein the at least one snowmaking device further includes a plurality of snowmaking devices, and wherein the navigating the aerial drone to be within a threshold proximity of the at least one snowmaking device further comprises navigating the aerial drone along a predetermined flight path between a first location within a first threshold proximity of a first snowmaking device of the plurality of snowmaking devices and a second location within a second threshold proximity of a second snowmaking device of the plurality of snowmaking devices.

18. The method of claim 14, wherein the at least one snowmaking device further includes a plurality of snowmaking devices, and wherein the navigating the aerial drone to be within a threshold proximity of the at least one snowmaking device further comprises sending a second signal from a remote controller to the aerial drone, the second signal being different from the signal, and the second signal indicating a movement of the aerial drone between a first location within a first threshold proximity of a first snowmaking device of the plurality of snowmaking devices and a second location within a second threshold proximity of a second snowmaking device of the plurality of snowmaking devices.

19. The method of claim 14, the method further comprising capturing images and/or video via a camera connected to the aerial drone and sending the captured images and/or video to a remote controller.

20. The method of claim 14, the method further comprising capturing images and/or video via a camera connected to the aerial drone;

sending the captured images and/or video to a remote controller in real-time; and inspecting the captured images and/or video to determine the openness of the at least one valve or to determine whether the aerial drone is within the threshold proximity of the at least one snowmaking device.

\* \* \* \* \*